(12) United States Patent  (10) Patent No.: US 8,509,945 B1
Snaith et al.  (45) Date of Patent: Aug. 13, 2013

(54) BAGGAGE HANDLING SYSTEM AND ASSOCIATED METHOD

(76) Inventors: Michael Snaith, Queens Village, NY (US); Juan Batista, Elmhurst, NY (US); Harvey Patton, Brooklyn, NY (US)

( * ) Notice: Subject to any disclaimer, the term of this patent is extended or adjusted under 35 U.S.C. 154(b) by 301 days.

(21) Appl. No.: 12/969,556

(22) Filed: Dec. 15, 2010

Related U.S. Application Data

(60) Provisional application No. 61/286,516, filed on Dec. 15, 2009.

(51) Int. Cl.
*G06F 7/00* (2006.01)

(52) U.S. Cl.
USPC ........... 700/218; 700/213; 700/214; 700/215; 700/223; 700/230; 198/349

(58) Field of Classification Search
None
See application file for complete search history.

(56) References Cited

U.S. PATENT DOCUMENTS

| | | | |
|---|---|---|---|
| 2010/0145502 A1* | 6/2010 | Kratzmaier | 700/218 |
| 2010/0239408 A1* | 9/2010 | Becker et al. | 414/800 |
| 2011/0088996 A1* | 4/2011 | Hoene | 198/349 |

* cited by examiner

*Primary Examiner* — Yolanda Jones

(57) ABSTRACT

An automated airport baggage handling system includes a baggage transport can transported with baggage between remote locations, a stationary baggage transport conveyor to transport the baggage, a communication link, a controller coupled to the baggage transport can and the baggage transport conveyor via the communication link, and a mobile robotic device controlled by the controller. A stationary guide track is located adjacent to the baggage transport can and the baggage transport conveyor, first sensors are located at the baggage transport can, the baggage transport conveyor, the robotic device and the guide track. A plurality of second sensors is attached to the baggage. The controller causes the robotic device to be displaced along the guide track in such a manner that the robotic device accesses the baggage transport can and thereafter accesses the transport conveyor while remaining positioned along the guide track.

8 Claims, 5 Drawing Sheets

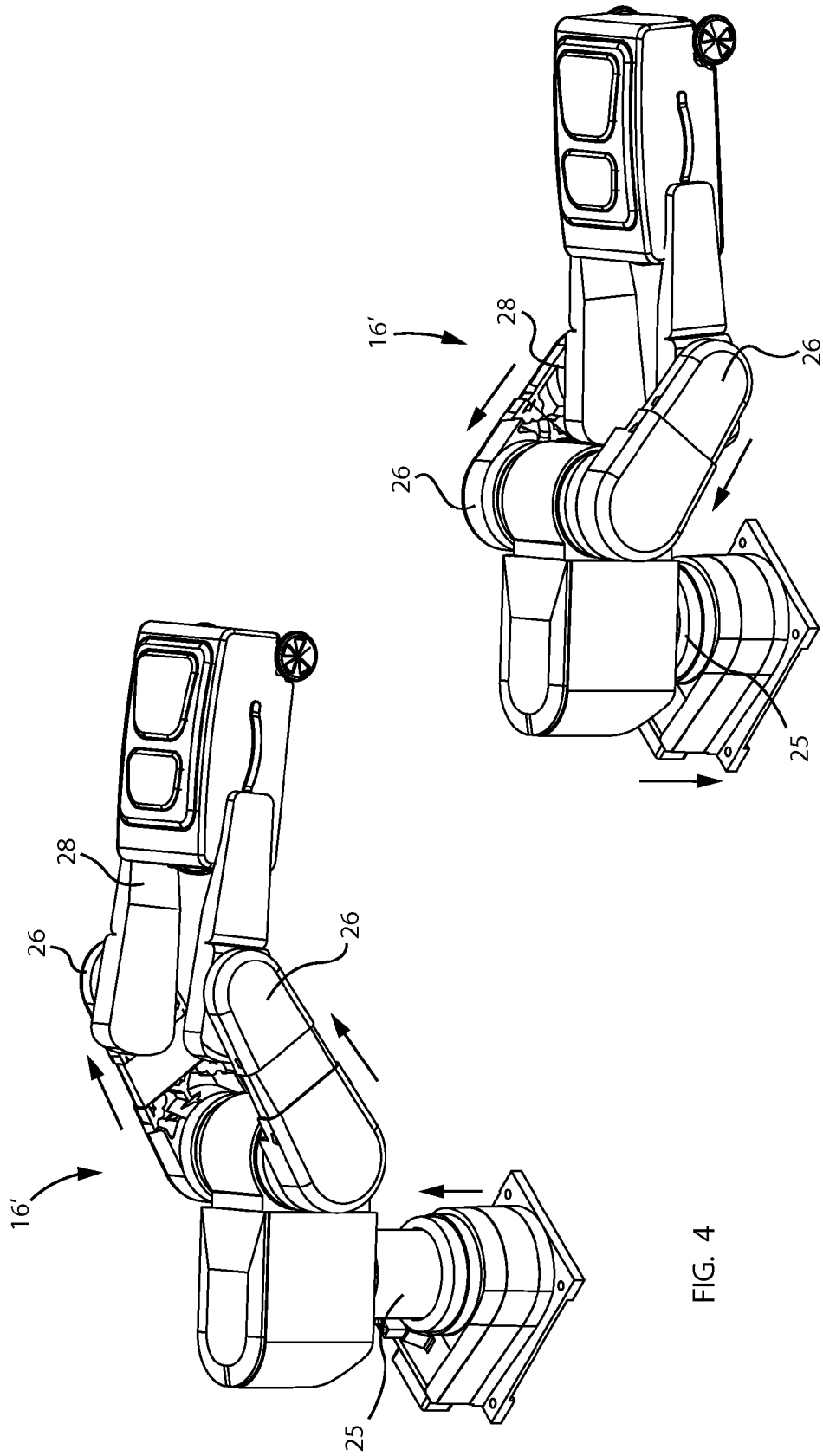

BAGGAGE HANDLING SYSTEM AND ASSOCIATED METHOD

CROSS REFERENCE TO RELATED APPLICATIONS

This application claims the benefit of U.S. Provisional Application No. 61/286,516, filed Dec. 15, 2009, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to airport baggage handling and, more particularly, to a baggage handling system and associated method for providing users with an efficient manner of sorting and processing baggage from air travel.

2. Prior Art

Travel, for much of human history, was a luxury and delight, an extravagance limited to the upper classes, or a hardship undertaken by poor but hopeful immigrants or refugees. Not so many generations past, people with the money and time could travel to Europe by ocean liner, hauling along three months worth of clothes in a couple of steamer trunks the size of office desks. No more. These days, travel is less pleasure than harrowing necessity for much of the working world, less high adventure than vocational ordeal.

Consider that in 2005, a total of 2.8 million articles of luggage were lost by airline travelers (which is to say lost by the airlines) leading not only to loss of valuables ranging from personal jewelry to business documents but inconvenience, delay, and frustration. Bags are x-rayed for security, sometimes opened and physically searched, and frequently lost or misdirected, causing us inconvenience at best and a ruined trip at worst. Nonetheless, we have to travel; it's part of contemporary business life, like the bizarre spectacle of airport terminals where thousands of harried people, chattering into headset cell phones, appear to be talking to themselves.

The amazing thing about airline baggage is not that so much is lost, but that the overwhelming majority of it gets to its destination, and is there to meet you at the baggage carousel. Sophisticated automated systems, "smart" conveyors; Destination Coded Vehicles or DCV's, which travel at high speed along complex webs within the heart of the terminal; and computerized tracking, sorting, and routing devices, play an ever larger part in handling and directing baggage. Unseen by travelers, these systems move baggage swiftly and efficiently through the underworld of the terminal. But in the end, sorting and loading your bags onto the right lane is the province of human baggage handlers, a labor force. Like any human labor force, baggage handlers can make mistakes, go on strike, and cost the airlines spiraling wages and health care expenditures, all expenses that automation would eliminate. Since the airlines underwent deregulation in 1978, profit margins have been thin, and cost-cutting measures constant. For the airlines and the airline travelers, then, complete baggage handling automation would appear to be highly desirable.

Accordingly, a need remains for a system in order to overcome the above-noted shortcomings. The present invention satisfies such a need by providing a baggage handling system that is convenient and easy to use, lightweight yet durable in design, and designed for providing users with an efficient means of sorting and moving baggage throughout an airport.

BRIEF SUMMARY OF THE INVENTION

In view of the foregoing background, it is therefore an object of the present invention to provide an automated airport baggage handling system. These and other objects, features, and advantages of the invention are provided by an automated airport baggage handling system including a mobile baggage transport can capable of being transported with baggage between remote locations, a stationary baggage transport conveyor adapted to transport the baggage in a predefined path, a communication link, a controller communicatively coupled to the baggage transport can and the baggage transport conveyor via the communication link, and a mobile robotic device remotely controlled by the controller via the a communication link.

The system may further include a stationary guide track located adjacent to the baggage transport can and the baggage transport conveyor, a plurality of first sensors removably located at the baggage transport can, the baggage transport conveyor, the robotic device and the guide track respectively. Notably, each of the sensors identify a location thereof relative to other the sensors respectively. A plurality of second sensors is capable of being removably attached to the baggage. In this manner, the controller causes the robotic device to be displaced along the guide track in such a manner that the robotic device accesses the baggage transport can and thereafter accesses the transport conveyor while remaining positioned along the guide track.

In one embodiment, the robotic device may be responsive to instruction signals transmitted by the controller. The controller may be responsive to feedback signals transmitted by the robotic device and the controller automatically modifies the instruction signals based upon a learned sequence of the feedback signals.

In one embodiment, the controller may include a hand-held user interface adapted to be worn by a user, a control center adapted to be operated by a non-user or a combination thereof respectively.

In one embodiment, the controller may include a processor, and a memory communicatively linked to the processor. Such a memory preferably includes a computer software program including a first executable control logic algorithm, when executed by the processor, causes the robotic device to load and unload the baggage from each of the baggage transport can and the baggage transport conveyor.

In one embodiment, the first executable control logic algorithm preferably includes the chronological steps of: registering an initial location of the first sensors relative to each other and thereby mapping a plurality of axes defining alternate travel paths for the robotic device; detecting an initial location of the second sensors relative to the first sensors; and instructing the robotic device to transport each of the second sensors from a first group of the first sensors to a second group of the first sensors such that the baggage is transported from the baggage transport can to the baggage transport conveyor.

In one embodiment, the robotic device may include a telescopic base, a plurality of telescopic armatures attached to the telescopic base, and a scanner located at the telescopic armatures. In this manner, the scanner is capable of scanning an identification barcode attached to the baggage.

In one embodiment, selected ones of the instruction signals cause the robotic device to move along the guide track to access the first and second sensors.

In one embodiment, selected ones of the feedback signals notify the controller whether the identification barcodes are recognized as one of authorized and unauthorized identification barcodes.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIGS. 4-5 illustrate the telescopic movement of the robotic device's base section and armatures.

Figure 1:
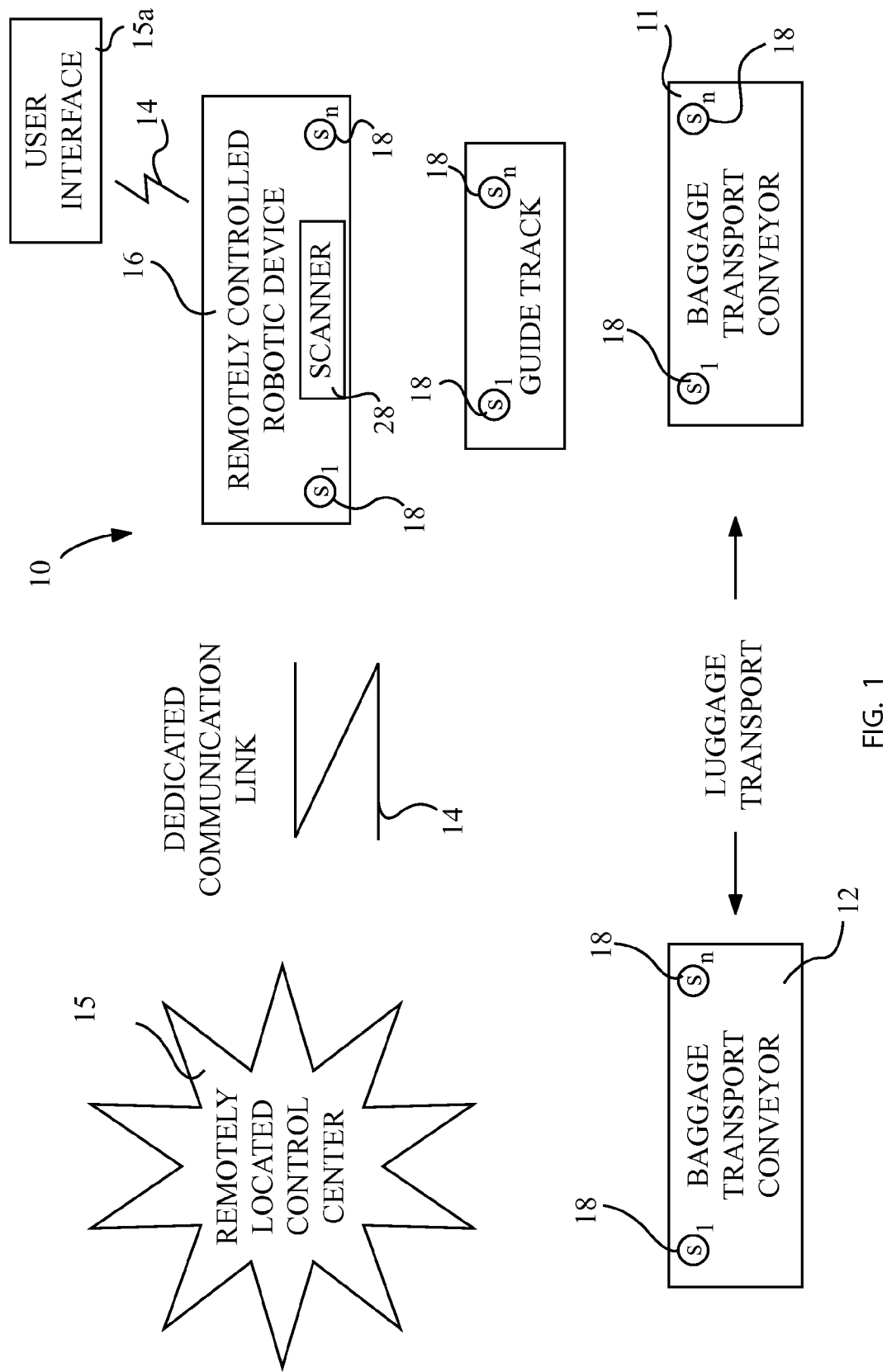
FIG. 1 is a high level schematic diagram showing the interrelationship between the major electronic components, in accordance with the present invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of system and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

Figure 2:
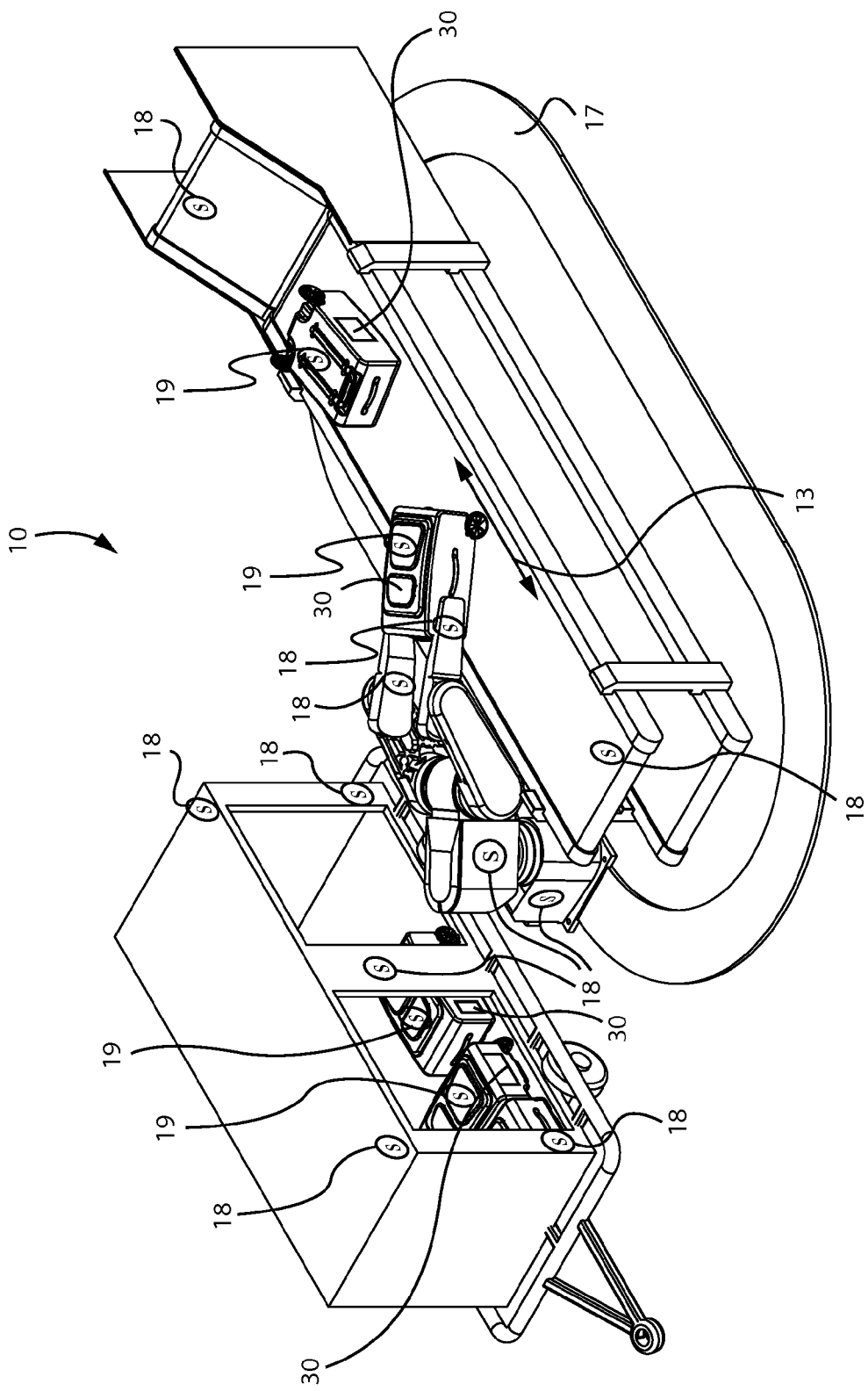
FIG. 2 is a perspective view showing the first and second sensors positioned on the various components of the present invention.
Figure 3:
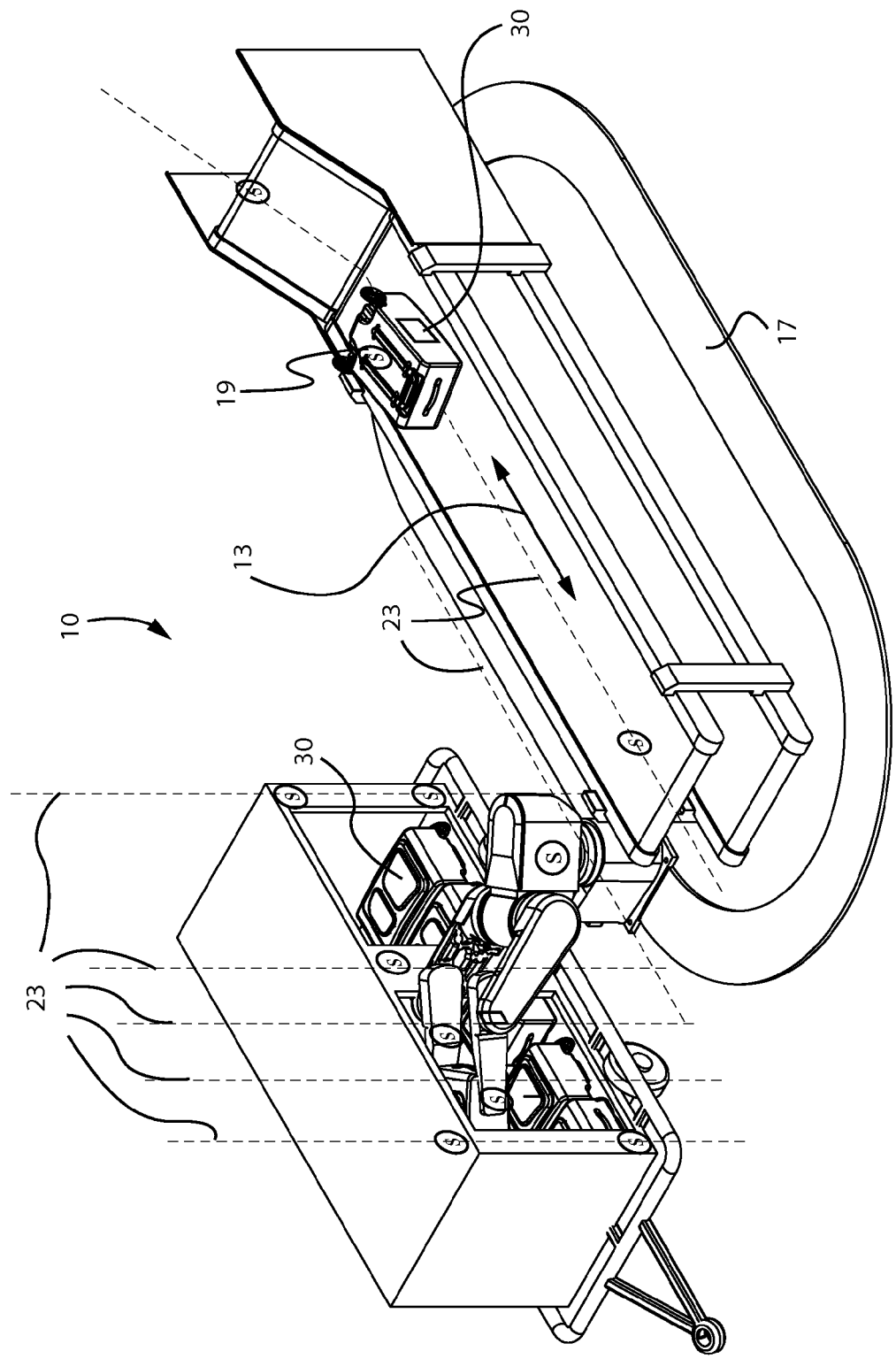
FIG. 3 is a perspective view showing an exemplary embodiment of travel axes and paths defined by the sensor locations relative to each other.
Figure 6:
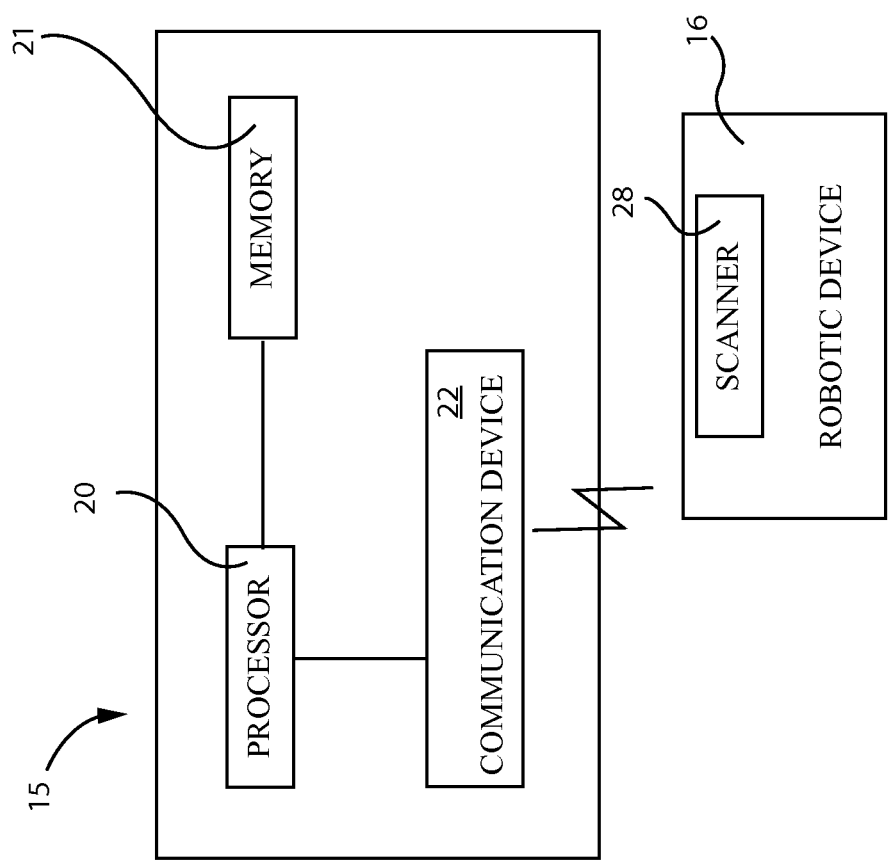
FIG. 6 is a schematic block diagram showing the interrelationship between the major electronic components of the controller, in accordance with one embodiment of the present invention.

The system of this invention is referred to generally in FIGS. 1-6 by the reference numeral 10 and is intended to provide an automated baggage transport system It should be understood that the automatic baggage transport system 10 may be used to transport luggage in many different types of baggage transport environments.

An automated airport baggage handling system 10 preferably includes a mobile baggage transport can 11 capable of being transported with baggage between remote locations such as from an airplane to a baggage retrieval location. A stationary baggage transport conveyor 12 is adapted to transport the baggage in a predefined path such as a linear conveyor 12 belt that displaces baggage from the can 11 to the baggage retrieval location, for example. A communication link 14 such as a dedicated wireless communication remotely couples a controller 15 to the baggage transport can 11 and the baggage transport conveyor 12. Such a communications link 14 may include various wireless protocols, the Internet, cellular network systems, etc. A mobile robotic device 16 is remotely controlled by the controller 15 via the communication link 14 base 25 on instructions transmitted from the controller 15. The combination of such claimed elements provides an unpredictable and unexpected benefit of automatically and remotely instructing the robotic device 16 to transport the baggage without direct human involvement, which solves the problem of paying several human employees to perform the baggage transporting tasks.

The system 10 may further include a stationary guide track 17 located adjacent to the baggage transport can 11 and the baggage transport conveyor 12. Examples of the guide track 17 may include magnetic and/or motorized guide tracks 17 that are activated and deactivated via the remotely located controller 15. A plurality of first sensors 18 may be removably located at the baggage transport can 11, the baggage transport conveyor 12, the robotic device 16 and the guide track 17 respectively. One skilled in the art understands such sensors 18 may be calibrated to detect and report the locations of the aforementioned components of the present invention. The locations may be reported to a GPS system 10 and monitored in real-time for tracking by the controller 15. Such locations may be displayed via a graphical user interface wherein a user may visually monitor movement of the aforementioned components without physically present at the job site, for example. Of course, such location reporting tasks may be performed in a manner well known by one skilled in the art.

Notably, each of the first sensors 18 identifies a location thereof relative to other first sensors 18 respectively. In this manner, the controller 15 receives and maps the GPS signals into a grid for each job site thereby enabling the user to learn the latitudinal/longitudinal size of the job site. A plurality of second sensors 19 may be removably attached to the baggage. Such sensors 19 may operate in a manner similar to the first sensors 18 for identifying and reporting the location of each baggage as it moves from one location to another. In this manner, the controller 15 causes the robotic device 16 to be displaced along the guide track 17 in such a manner that the robotic device 16 accesses the baggage transport can 11 and thereafter accesses the transport conveyor 12 while remaining positioned along the guide track 17. The combination of such claimed elements provides an unpredictable and unexpected benefit of remotely instructing the robotic device 16 to seek and retrieve each baggage within the can 11 or conveyor 12 such that no baggage is left behind, which solves the problem of human error that overlooks small bags during the baggage transport process.

In one embodiment, the robotic device 16 may be responsive to instruction signals transmitted by the controller 15. Such instruction signals are continuously transmitted by the controller 15 until each second sensor 19 is displaced from a starting zone to an ending zone. The controller 15 may be responsive to feedback signals transmitted by the robotic device 16 and the controller 15 automatically modifies the instruction signals based upon a learned sequence of the feedback signals. For example, during real-time baggage transport, the robotic device 16 notifies the controller 15 of the progress. When a predetermined number of bags are moved from the can 11 to the conveyor 12, a feedback signal may be transmitted to the controller 15 for visually depicting the real-time progress of the task. In this manner, the robotic device 16 may be retrofitted with communications devices 22 that are interfaced with the communications link 14, in a manner well known in the industry. The combination of such claimed elements provides an unpredictable and unexpected benefit of keeping real-time track of the baggage transport progress, which solves the problem of not knowing which bags are misplaced.

In one embodiment, the controller 15 may include a hand-held user interface 15a adapted to be worn by a user. Alternately, the controller 15 may include a control center operated by a non-user. Yet another embodiment may include a combination of the hand-held user interface 15a wherein a user may monitor the baggage transport process from a local site while the control center 15 monitors several baggage transport processes from a remote site.

In one embodiment, the controller 15 may include a processor 20, and a memory 21 communicatively linked to the processor 20. Such a memory 21 preferably includes a computer software program including a first executable control logic algorithm, when executed by the processor 20, causes the robotic device 16 to load and unload the baggage from each of the baggage transport can 11 and the baggage transport conveyor 12. Again, the robotic device 16 is controlled via the instructions signals transmitted from the controller 15. In addition, the robotic device 16 is capable of transmitting feedback signals in a manner well known in the industry such the user and/or control center maintains an up to date database of information associated with baggage transport.

In one embodiment, the first executable control logic algorithm preferably includes the chronological steps of: registering an initial location of the first sensors 18 relative to each other and thereby mapping a plurality of axes 23 defining alternate travel paths 13 for the robotic device 16. Such initial locations thereby define a grid, for example, wherein the controller 15 is able to learn the physical dimensions of the job site. Such dimensions may be identified along x, y and z axes, for example. Another step may include detecting an initial location of the second sensors 19 relative to the first sensors 18 whereby the controller 15 is able to calculate the distance and direction to move the robotic device 16 for accessing and retrieving the bags. Another step may include instructing the robotic device 16 to transport each of the second sensors 19 from a first group (located at the can 11) of the first sensors 18 to a second group (located at the conveyor) of the first sensors 18 such that the baggage is transported from the baggage transport can 11 to the baggage transport conveyor 12. Once the first sensors 18s are categorized into first and second groups, each being associated with either the can 11 or the conveyor 12, the controller 15 is able to calculate the estimated number of iterations necessary to transporting all the bags from the can 11 to the conveyor 12, for example. The combination of such claimed elements provides an unpredictable and unexpected benefit of understanding an estimated total time to finish the job, which solves the problem of not knowing how much time to allocate for baggage transport at the job site.

In one embodiment, the robotic device 16 may include a telescopic base 25, a plurality of telescopic armatures 26 attached to the telescopic base 25, and a scanner 28 located at the telescopic armatures 26. In this manner, the scanner 28 is capable of scanning an identification barcode 30 attached to the baggage. The telescopic base 25 and armatures 26 may be activated via conventional actuators and communication devices 22 incorporated within the robotic device 16, in a manner well known in the industry. Likewise, the scanner 28 may be interfaced with the communications link 14 for transmitting real time baggage data to the controller 15. As an example, selected ones of the feedback signals notify the controller 15 whether the identification barcodes 30 are recognized as one of authorized and unauthorized identification barcodes. Thus, the controller 15 quickly learns whether a bag has been accidentally misplaced or sent to a wrong can 11 and/or conveyor 12.

In one embodiment, selected ones of the instruction signals cause the robotic device 16 to move along the guide track 17 to access the first and second sensors 18, 19. As noted hereinabove, the robotic device 16 may be transported along the guide track 17 as needed to retrieve and transport the bags from the can 11 to the conveyor 12.

The user interface 15a may include a variety of stand-alone or shared devices that are capable of generating and transmitting a control signal upon receiving a user input. For example, exemplary user interface 15a devices may include a remote controller 15 employing RF, infra-red, acoustic or cellular technology, as well known in the industry. In alternate embodiments, the user interface 15a may include a handheld computer, a PDA, a cell phone, a keyboard, a mouse, etc. that may be comprised of commercially available hardware and software operating systems, for example. The aforementioned user interfaces are intended to represent a broad category of exemplary user interfaces capable of functioning in accordance with the present invention. Of course, the user interface 15 as may include other components, peripherals and software applications provided they are compatible and capable of cooperating with remaining devices of the present invention. In addition, the user interfaces may include information, documents, data and files needed to provide functionality and enable performance of methodologies in accordance with an exemplary embodiment of the invention.

As a non-limiting example, a user may instruct the controller 15 to program the robotic device 16 to load and unload bags out of various types of cans 11 and onto various types of conveyors 12. The controller 15 may then communicate with the robotic device 16 and relay commands. The robotic device 16 would then retrieve baggage from an airport luggage can 11 and sort the baggage. Finally, the baggage would be loaded onto the appropriate luggage conveyor 12. Some of the system 10 capabilities may include: loading a flight with multiple different destinations, scanning bags to determine weight and destination, loading up to four flights simultaneously.

In an alternative embodiment, the baggage handling system 10 could be designed to serve other types of infrastructure. The system 10 could be adapted to fit train stations, bus stations, and/or shipping ports. This would allow users to handle baggage for nearly any kind of transportation and ensure that the benefits would extend to the entire industry.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. An automated airport baggage handling system comprising:
    a baggage transport can capable of being transported with baggage between remote locations;
    a baggage transport conveyor adapted to transport the baggage in a predefined path;
    a communication link;
    a controller communicatively coupled to said baggage transport can and said baggage transport conveyor via said communication link; and
    a robotic device remotely controlled by said controller via said a communication link;
    a guide track located adjacent to said baggage transport can and said baggage transport conveyor;
    a plurality of first sensors located at said baggage transport can, said baggage transport conveyor, said robotic device and said guide track respectively, each of said sensors identifying a location thereof relative to other said sensors respectively;
    a plurality of second sensors capable of being removably attached to the baggage;
    wherein said controller causes said robotic device to be displaced along said guide track in such a manner that said robotic device accesses said baggage transport can and thereafter accesses said transport conveyor while remaining positioned along said guide track;
    wherein said robotic device is responsive to instruction signals transmitted by said controller;
    wherein said controller is responsive to feedback signals transmitted by said robotic device;
    wherein said controller automatically modifies said instruction signals based upon a learned sequence of said feedback signals;
    wherein said controller comprises one of a hand-held user interface adapted to be worn by a user, a control center adapted to be operated by a non-user and a combination thereof respectively;
    wherein said controller comprises:
    a processor; and
    a memory communicatively linked to said processor, said memory including a computer software program including a first executable control logic algorithm, when executed by said processor causes said robotic device to load and unload the baggage from each of said baggage transport can and said baggage transport conveyor;
    wherein said first executable control logic algorithm comprises the chronological steps of:
    registering an initial location of said first sensors relative to each other and thereby mapping a plurality of axes defining alternate travel paths for said robotic device;
    detecting an initial location of said second sensors relative to said first sensors; and
    instructing said robotic device to transport each of said second sensors from a first group of said first sensors to a second group of said first sensors such that the baggage is transported from said baggage transport can to said baggage transport conveyor.

2. The automated airport baggage handling system of claim 1, wherein said robotic device comprises:
    a telescopic base;
    a plurality of telescopic armatures attached to said telescopic base; and
    a scanner located at said telescopic armatures, said scanner being capable of scanning an identification barcode attached to the baggage.

3. The automated airport baggage handling system of claim 2, wherein selected ones of said instruction signals cause said robotic device to move along said guide track to access said first and second sensors.

4. The automated airport baggage handling system of claim 3, wherein selected ones of said feedback signals notify said controller whether said identification barcodes are recognized as one of authorized and unauthorized identification barcodes.

5. An automated airport baggage handling system comprising:
- a mobile baggage transport can capable of being transported with baggage between remote locations;
- a stationary baggage transport conveyor adapted to transport the baggage in a predefined path;
- a communication link;
- a controller communicatively coupled to said baggage transport can and said baggage transport conveyor via said communication link; and
- a mobile robotic device remotely controlled by said controller via said a communication link;
- a stationary guide track located adjacent to said baggage transport can and said baggage transport conveyor;
- a plurality of first sensors removably located at said baggage transport can, said baggage transport conveyor, said robotic device and said guide track respectively, each of said sensors identifying a location thereof relative to other said sensors respectively;
- a plurality of second sensors capable of being removably attached to the baggage;
- wherein said controller causes said robotic device to be displaced along said guide track in such a manner that said robotic device accesses said baggage transport can and thereafter accesses said transport conveyor while remaining positioned along said guide track;
- wherein said robotic device is responsive to instruction signals transmitted by said controller;
- wherein said controller is responsive to feedback signals transmitted by said robotic device;
- wherein said controller automatically modifies said instruction signals based upon a learned sequence of said feedback signals;
- wherein said controller comprises one of a hand-held user interface adapted to be worn by a user, a control center adapted to be operated by a non-user and a combination thereof respectively;
- wherein said controller comprises:
  - a processor; and
  - a memory communicatively linked to said processor, said memory including a computer software program including a first executable control logic algorithm, when executed by said processor causes said robotic device to load and unload the baggage from each of said baggage transport can and said baggage transport conveyor;
- wherein said first executable control logic algorithm comprises the chronological steps of:
- registering an initial location of said first sensors relative to each other and thereby mapping a plurality of axes defining alternate travel paths for said robotic device;
- detecting an initial location of said second sensors relative to said first sensors; and
- instructing said robotic device to transport each of said second sensors from a first group of said first sensors to a second group of said first sensors such that the baggage is transported from said baggage transport can to said baggage transport conveyor.

6. The automated airport baggage handling system of claim 5, wherein said robotic device comprises:
- a telescopic base;
- a plurality of telescopic armatures attached to said telescopic base; and
- a scanner located at said telescopic armatures, said scanner being capable of scanning an identification barcode attached to the baggage.

7. The automated airport baggage handling system of claim 6, wherein selected ones of said instruction signals cause said robotic device to move along said guide track to access said first and second sensors.

8. The automated airport baggage handling system of claim 7, wherein selected ones of said feedback signals notify said controller whether said identification barcodes are recognized as one of authorized and unauthorized identification barcodes.

* * * * *